United States Patent
Schneider et al.

(10) Patent No.: US 6,857,510 B2
(45) Date of Patent: Feb. 22, 2005

(54) FORCED AIR COOLING SYSTEM FOR VEHICLE DRIVELINE COMPONENTS

(75) Inventors: Mark M. Schneider, Royal Oak, MI (US); Larry W. Bowman, Troy, MI (US); Eric B. Ratts, Northville, MI (US); Paul R. Sieber, Rochester Hills, MI (US); Robert W. Hildebrand, Rochester Hills, MI (US); Michael E. Johnson, Rochester, MI (US); James R. Brichta, Highland, MI (US)

(73) Assignee: AxleTech International IP Holdings, LLC, Troy, MI (US)

( * ) Notice: Subject to any disclaimer, the term of this patent is extended or adjusted under 35 U.S.C. 154(b) by 188 days.

(21) Appl. No.: 10/116,256

(22) Filed: Apr. 4, 2002

(65) Prior Publication Data

US 2003/0188936 A1 Oct. 9, 2003

(51) Int. Cl.[7] .............................................. F16D 65/853
(52) U.S. Cl. .............. 188/264 A; 267/71.6; 267/264 F; 74/606 A
(58) Field of Search ............... 188/71.6, 264 R–264 W; 74/606 A

(56) References Cited

U.S. PATENT DOCUMENTS

| | | | |
|---|---|---|---|
| 2,500,216 A | * | 3/1950 | Szekely ..................... 310/75 R |
| 2,756,614 A | * | 7/1956 | Kobayashi ................ 74/606 A |
| 2,792,091 A | * | 5/1957 | Beck et al. ............. 188/264 A |
| 3,118,387 A | | 1/1964 | Aldrich |
| 3,251,437 A | * | 5/1966 | Moyer et al. ......... 188/264 AA |
| 3,301,357 A | * | 1/1967 | Cussons et al. ......... 188/264 R |
| 3,590,960 A | | 7/1971 | Reynolds |
| 3,592,304 A | | 7/1971 | Thompson |
| 3,664,467 A | * | 5/1972 | Lucien et al. .............. 188/71.6 |
| 3,730,301 A | | 5/1973 | Heck et al. |
| 3,814,222 A | | 6/1974 | Koivunen |
| 3,907,073 A | | 9/1975 | Harrison |
| 4,069,906 A | | 1/1978 | Handke |
| 4,383,589 A | * | 5/1983 | Fox ........................... 180/165 |
| 4,440,270 A | * | 4/1984 | Ross .................... 188/264 AA |
| 4,508,200 A | | 4/1985 | Cigognini |
| 4,592,452 A | * | 6/1986 | Merle ................... 188/264 AA |
| 4,736,821 A | | 4/1988 | Ries |
| 4,799,564 A | * | 1/1989 | Iijima et al. ............... 180/65.5 |
| 5,190,123 A | | 3/1993 | Hvolka |
| 5,215,156 A | * | 6/1993 | Stulbach et al. ........... 180/65.3 |
| 5,215,168 A | * | 6/1993 | Guiot et al. ............... 188/71.6 |
| 5,680,908 A | * | 10/1997 | Reed .......................... 180/65.3 |
| 5,927,384 A | * | 7/1999 | Waldner, Jr. ................. 165/47 |
| 6,036,615 A | * | 3/2000 | Young et al. ............... 475/161 |
| 6,296,087 B1 | | 10/2001 | Bissonnette et al. |
| 6,446,766 B1 | * | 9/2002 | Cornolti et al. ............ 188/71.6 |

* cited by examiner

*Primary Examiner*—Robert Siconolfi
(74) *Attorney, Agent, or Firm*—Howard & Howard

(57) ABSTRACT

A vehicle driveline component temperature control assembly utilizes compressed air or another fluid to cause air flow across an external portion of the driveline component. The airflow facilitates heat transfer or heat dissipation from within the driveline component to assist in maintaining the temperature of the component within an acceptable range. A supply of compressed air or other fluid communicates with at least one discharge device supported on an external housing of the driveline component. The discharge device includes at least one manifold having at least one opening through which the compressed air is delivered to create an airflow across the external surface of the housing. In one example, each discharge device comprises multiple, generally C-shaped manifolds that are secured in place and supported on the external surface of the housing. The inventive arrangement is particularly useful for off-highway vehicle driveline components such as axle and wet disc brake assemblies.

10 Claims, 1 Drawing Sheet

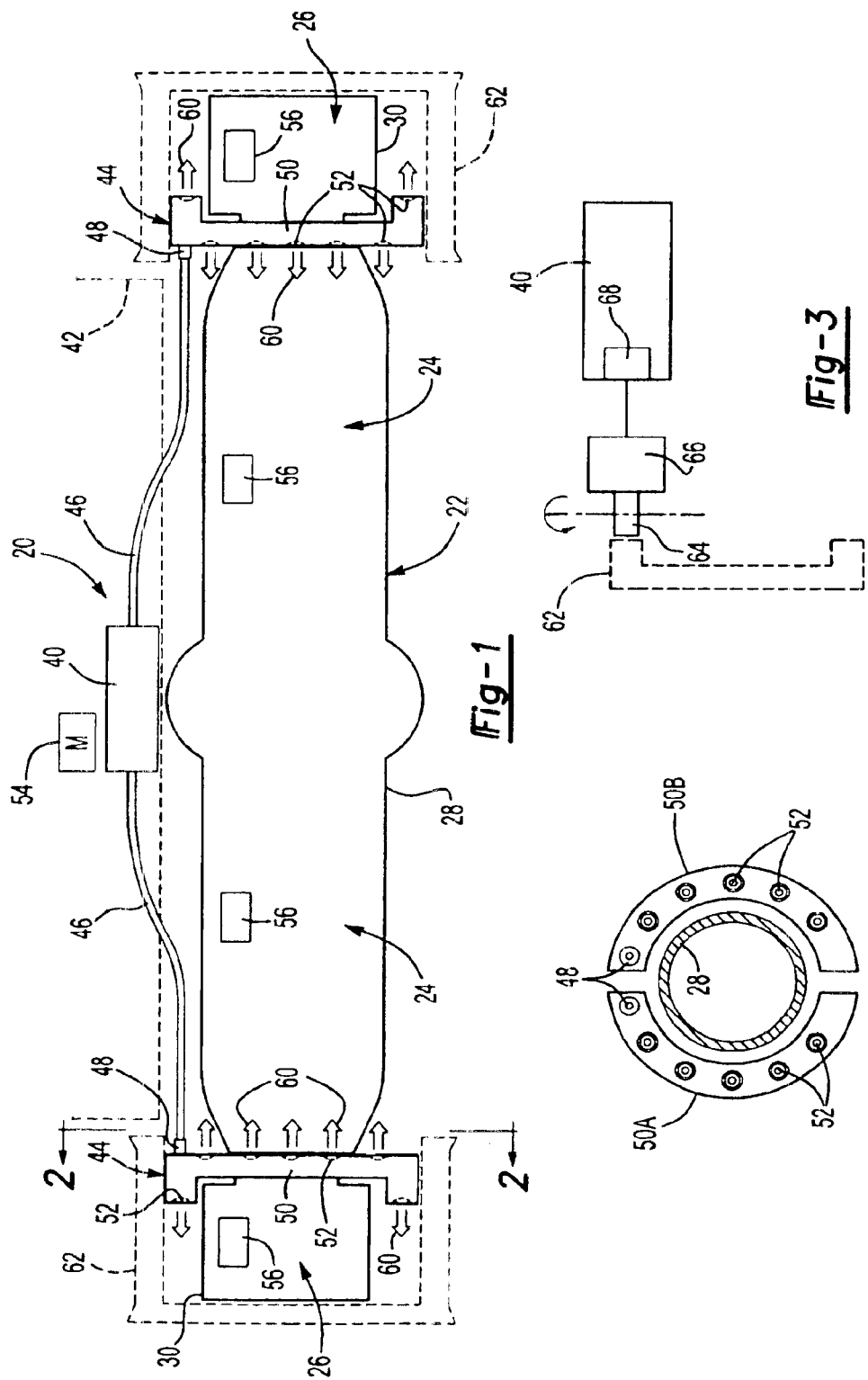

FORCED AIR COOLING SYSTEM FOR VEHICLE DRIVELINE COMPONENTS

BACKGROUND OF THE INVENTION

This invention generally relates to controlling the temperature of a vehicle driveline component. More particularly, this invention relates to using a flow of air across the driveline component to facilitate keeping the temperature of the component within a desired range.

A variety of vehicles are manufactured for a variety of purposes. Examples include passenger vehicles, heavy vehicles such as trucks, and off highway vehicles. Each type of vehicle has particular component requirements to meet the needs of the typical situation in which the vehicle is placed during use. Accordingly, a variety of vehicle components have been developed, each having its own benefits and, in some cases, shortcomings or drawbacks.

In off-highway type vehicles, for example, oil in the brake and axle assemblies tends to heat up during braking applications. In many cases, especially in the case of liquid cooled wet disc brakes, the generated heat exceeds that which can be dissipated by the axle assembly or brake assembly using normal passive methods.

The heat build up must be dissipated to maximize component life and performance. The fatigue performance of components such as gears decreases with incremental rises in temperature. By maintaining an adequate temperature for such components, the fatigue performance is enhanced.

Vehicle manufacturers and suppliers have been forced to design complex and often undesirably costly cooling systems in an attempt to regulate the temperature within the components resulting from braking applications. Alternative heat dissipation techniques are needed.

This invention provides a temperature regulation strategy that economically maintains at least a portion of a driveline component, such as an axle or brake assembly, within a desired operating range.

SUMMARY OF THE INVENTION

In general terms, this invention is an assembly that uses a flow of air or another fluid across a driveline component to control the temperature of the component. The flow of air facilitates cooling the component when the temperature becomes undesirably high.

An assembly designed according to this invention includes a housing that houses at least portions of the selected driveline component. A supply of compressed fluid is supported somewhere on the vehicle or on the component, depending on the needs of a particular situation. A discharge device is supported on the component housing and is in fluid communication with the compressed fluid supply. The discharge device has a plurality of openings to allow the compressed fluid to flow through the openings and over at least a portion of the housing in the vicinity of the discharge device. The fluid flow facilitates dissipating heat from the housing as the driveline component temperature increases.

In one example, the driveline component includes an axle assembly and wet disc brake assemblies. This particular example is useful for off-highway vehicles. The axle assembly and brake assemblies are contained within a single housing. A plurality of discharge device manifolds are supported on the housing. Each manifold has at least one opening through which the compressed fluid flows to provide an airflow across the outer housing surface. The airflow facilitates dissipating heat from the housing.

The various features and advantages of this invention will become apparent to those skilled in the art from the following detailed description of the currently preferred embodiments. The drawings that accompany the detailed description can be briefly described as follows.

BRIEF DESCRIPTION OF THE DRAWINGS

FIG. 1 schematically illustrates a system designed according to this invention.

FIG. 2 is a cross sectional illustration taken along the lines 2—2 of FIG. 1.

FIG. 3 schematically illustrates a power supply arrangement designed according to an embodiment of this invention.

DETAILED DESCRIPTION OF THE PREFERRED EMBODIMENT

An assembly 20 for controlling the temperature of a driveline component 22 by utilizing a flow of air to facilitate dissipating heat from the component 22 is shown in FIG. 1. In the illustrated example, the driveline component 22 includes an axle assembly 24 and brake assemblies 26. The axle assembly 24 is within a first housing portion 28 while the brake assemblies 26 are within second housing portions 30 coupled to the first housing portion 28. Such an arrangement is particularly useful for off-highway vehicles. Such housings and components are known including, for example, wet disc brake assemblies. As known, a single housing is often made to house the axle and brake assemblies together.

The assembly includes a supply of pressurized fluid 40. In most examples, the fluid will be air. Other fluids could be used in systems designed according to this invention. The fluid supply 40 may be supported on the vehicle schematically illustrated at 42 in a convenient, suitable location. Alternatively, the fluid supply 40 may be supported on the external housing of the driveline component, depending on the particular situation.

Discharge devices 44 receive compressed fluid from the fluid supply 40 through tubing 46. Each discharge device includes at least one supply connection 48 that provides an inlet for the pressurized air or other fluid from the supply 40.

Each of the discharge devices 44 includes a manifold 50 that is supported on the housing of the driveline component 22. In one example, the manifold 50 is bolted in place and supported on the external surface of the housing 28.

In the illustrated example, the first 28 and second 30 housing portions are generally cylindrical. The discharge devices 44 each comprise two generally C-shaped manifolds 50A and 50B positioned on opposite sides of the first housing portion 28 and substantially surrounding the first housing portion 28 to define a collar about the first housing portion 28. Utilizing two manifold portions provides easier assembly of the discharge device 44 onto the housing portions 28, 30 after the housing portions 28, 30 have been manufactured and appropriately arranged with the operative portions of the axle 24 and brake 26 assemblies. Each manifold portion 50A, 50B preferably includes a plurality of openings 52 through which the compressed air or other fluid exits the manifold 50A, 50B to flow across the external surface of the first housing portion 28 in a first direction and the second housing portion 30 in a second direction away from and opposite to the first direction.

A controller 54 communicates with one or more temperature sensors 56 that provide an indication of the temperature of the driveline component of interest. The illustrated example includes temperature sensors 56 associated with each of the brake assemblies 26 and the axle assembly 24. Communication between the controller 54 and the sensors 56 may be wireless or through hard wire connections, for example. The controller 54 can be a commercially available microprocessor suitably programmed to perform the functions needed to accomplish the results provided by this invention. In one example, the controller 54 is a dedicated portion of a controller already present on the vehicle such as an engine controller. In another example, the controller 54 is a separate microprocessor. Given this description, those skilled in the art will be able to select from among commercially available components and to suitably program the controller to accomplish the results provided by this invention to meet the needs of their particular situation.

The controller 54 preferably determines when the temperature of the driveline component exceeds a selected threshold. The temperature sensors 56 provide an indication of the temperature that is interpreted by the controller to make such a determination. When it is desirable to cool the component, the controller 54 preferably causes the pressurized air or other fluid from the supply 40 to be delivered to the discharge devices 44 where the compressed air or other fluid flows through the openings 52 across the external surfaces of the housing portion 28 and 30. The flow of air is schematically shown at 60. By providing this type of air flow across the external surface of the housing, heat transfer through the housing, which allows internal lubricants such as oil within the housing to cool. Facilitating more effective heat dissipation from the housing facilitates more rapidly cooling the temperature of the internal operative portions of the driveline component 22. Facilitating such cooling provides better control of the temperature of the various portions of the driveline component 22.

The illustrated example includes a first plurality of openings 52 that are positioned to direct airflow across the axle housing portion 28. A second plurality of openings 52 are positioned to direct air flow across the brake assembly housing portions 30. When wheel rims schematically illustrated at 62 extend over at least a portion of the driveline component housing, at least one of the openings 52 preferably is positioned to direct airflow into the dead space between the wheel rim 62 and the housing 30, for example. Because there is normally not any significant air flow in such regions, this invention provides the ability to greatly enhance the ability to dissipate heat through such portions of the component housing.

There are a variety of fluid supply devices that are known which could be used as the pressurized fluid supply 40. In one example, the supply 40 includes a compressor that receives energy for operating from the rotation of at least one rotary member associated with the driveline component 22. In one example, as the wheel rim 62 rotates, it causes rotation of a rotating member 64, which provides the ability for a converting module 66 to then supply operating energy to a compressor 68. In the example of FIG. 3, the compressor 68 is illustrated as a portion of the fluid supply 40. In another example, the compressor 68 is an independent component from the fluid supply reservoir.

In another example, rotary motion of the axle (not illustrated) within the axle assembly 24 is converted into energy that is used by a compressor to supply compressed air for the assembly 20. Given this description, those skilled in the art will be able to select an appropriate rotating member and to utilize known means, such as a gearing arrangement or an electrical generator arrangement that operates off of an applied torque, to realize a power supply for a compressor for the compressed fluid supply 40. In another example, the power supply to the compressed air source 40 is achieved in a conventional manner, such as deriving electrical energy from a vehicle alternator or battery.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. An assembly for controlling a temperature of lubricant surrounding a brake component and an axle component of a vehicle, comprising:

a housing having a first housing portion for fully enclosing and sealing the axle component and associated lubricant therein and a second housing portion coupled to said first housing portion for fully enclosing and sealing the brake component and associated lubricant therein;

a supply of compressed fluid; and a discharge device supported on said housing and defining a first plurality of openings in fluid communication with said supply of compressed fluid for directing the compressed fluid across said first housing portion in a first direction and a second plurality of openings in fluid communication with said supply of compressed fluid for directing the compressed fluid across said second housing portion in a second direction away from and opposite to said first direction whereby the compressed fluid moving across said housing portions removes heat from the lubricant by way of heat transfer through said housing portions.

2. The assembly of claim 1 including at least one wheel rim supported near said housing and defining a space therebetween whereby said discharge device directs the compressed fluid across said housing and into said space.

3. The assembly of claim 1 wherein said discharge device is further defined as a manifold comprising two generally C-shaped portions positioned on opposite sides of said housing and substantially surrounding said housing with each of said C-shaped portions defining said first and second plurality of openings therein.

4. The assembly of claim 1 including a compressor coupled to said supply of compressed fluid whereby the compressed fluid is further defined as compressed air and said compressor compresses the air.

5. The assembly of claim 1 including a temperature sensor adjacent to said housing and a controller in operative communication with said temperature sensor for determining a temperature of at least one of the brake component and the axle component and delivering the compressed fluid through said discharge device across said first and second housing portions when the temperature exceeds a selected temperature.

6. An assembly for controlling a temperature of lubricant surrounding a vehicle driveline component, comprising:

a housing for fully enclosing and sealing the vehicle driveline component and lubricant therein;

a supply of compressed fluid; and a manifold comprising first and second C-shaped portions positioned on opposite sides of said housing and substantially surrounding said housing such that said C-shaped portions together define a collar about said housing with each of said C-shaped portions defining at least one first opening in fluid communication with said supply of compressed fluid for directing compressed fluid across said housing in a first direction and at least one second opening in fluid communication with said supply of compressed fluid for directing compressed fluid across said housing in a second direction away from and opposite to said first direction whereby the compressed fluid moving across said housing removes heat from the lubricant by way of heat transfer through said housing.

7. The assembly of claim 6 including at least one wheel rim supported near said housing and defining a space therebetween whereby each of said C-shaped portions direct the compressed fluid across said housing and into said space.

8. The assembly of claim 7 including a compressor coupled to said supply of compressed fluid whereby the compressed fluid is further defined as compressed air and said compressor compresses the air.

9. The assembly of claim 8 including a temperature sensor adjacent to said housing and a controller in operative communication with said temperature sensor for determining a temperature of at least one of the brake component and the axle component and delivering the compressed air through said discharge device across said first and second housing portions when the temperature exceeds a selected temperature.

10. An assembly for controlling a temperature of lubricant surrounding a brake component and an axle component of a vehicle, comprising:

a housing comprising a first housing portion for fully enclosing and sealing the axle component and associated lubricant therein and a second housing portion coupled to said first housing portion for fully enclosing and sealing the brake component and associated lubricant therein;

a compressor for supplying compressed air;

a manifold comprising first and second C-shaped portions positioned on opposite sides of said housing and substantially surrounding said housing such that said C-shaped portions together define a collar about said housing with each of said C-shaped portions defining a first plurality of openings in fluid communication with said compressor for directing the compressed air across said first housing portion in a first direction and a second plurality of openings for directing the compressed air across said second housing portion in a second direction away from and opposite to said first direction whereby the compressed fluid moving across said housing portions removes heat from the lubricant by way of heat transfer through said housing portions;

a temperature sensor adjacent to said housing; and a controller in operative communication with said temperature sensor for determining the temperature of at least one of the lubricant, the brake component and the axle component and delivering the compressed air through each of said C-shaped portions and across said first and second housing portions when the temperature exceeds a selected temperature.

* * * * *